Nov. 9, 1948.  P. H. CLAY  2,453,197
DISK PLOW ATTACHMENT FOR TRACTORS
Filed Nov. 9, 1944  3 Sheets-Sheet 1

Inventor
Paul H. Clay

Nov. 9, 1948.  P. H. CLAY  2,453,197
DISK PLOW ATTACHMENT FOR TRACTORS
Filed Nov. 9, 1944  3 Sheets-Sheet 2

Inventor
Paul H. Clay

By Clarence A. O'Brien
and Harvey B. Jacobson
Attorneys

Nov. 9, 1948.  P. H. CLAY  2,453,197

DISK PLOW ATTACHMENT FOR TRACTORS

Filed Nov. 9, 1944  3 Sheets-Sheet 3

Inventor

Paul H. Clay

By *Clarence A. O'Brien*
and *Harvey B. Jacobson*
Attorneys

Patented Nov. 9, 1948

2,453,197

UNITED STATES PATENT OFFICE 2,453,197

DISK PLOW ATTACHMENT FOR TRACTORS

Paul H. Clay, Asheville, N. C., assignor of one-third to Charles H. Landers and one-third to Eugene Sluder, Weaverville, N. C.

Application November 9, 1944, Serial No. 562,681

1 Claim. (Cl. 97—47)

The present invention relates to new and useful improvements in disk plows and has for its primary object to provide means for attaching the plow to a tractor and by means of which the position of the plow may be easily adjusted for use either as a level land plow, or for plowing on a hillside.

More specifically the invention embodies a plow beam which is pivotally attached to the tractor for swinging laterally toward either side of the tractor, and also including means adapted for attaching to a conventional hydraulic lift of the tractor for raising and lowering the plow into and out of operative position.

An important object of the present invention is to provide a laterally swinging plow beam adapted to gravitate toward the low side of the tractor when plowing on a hillside together with catch means or retaining the plow at either side of the tractor.

A still further object is to provide a device of this character of simple and practical construction, which is efficient and reliable in performance, relatively inexpensive to manufacture, easy to install in operative position on a tractor and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
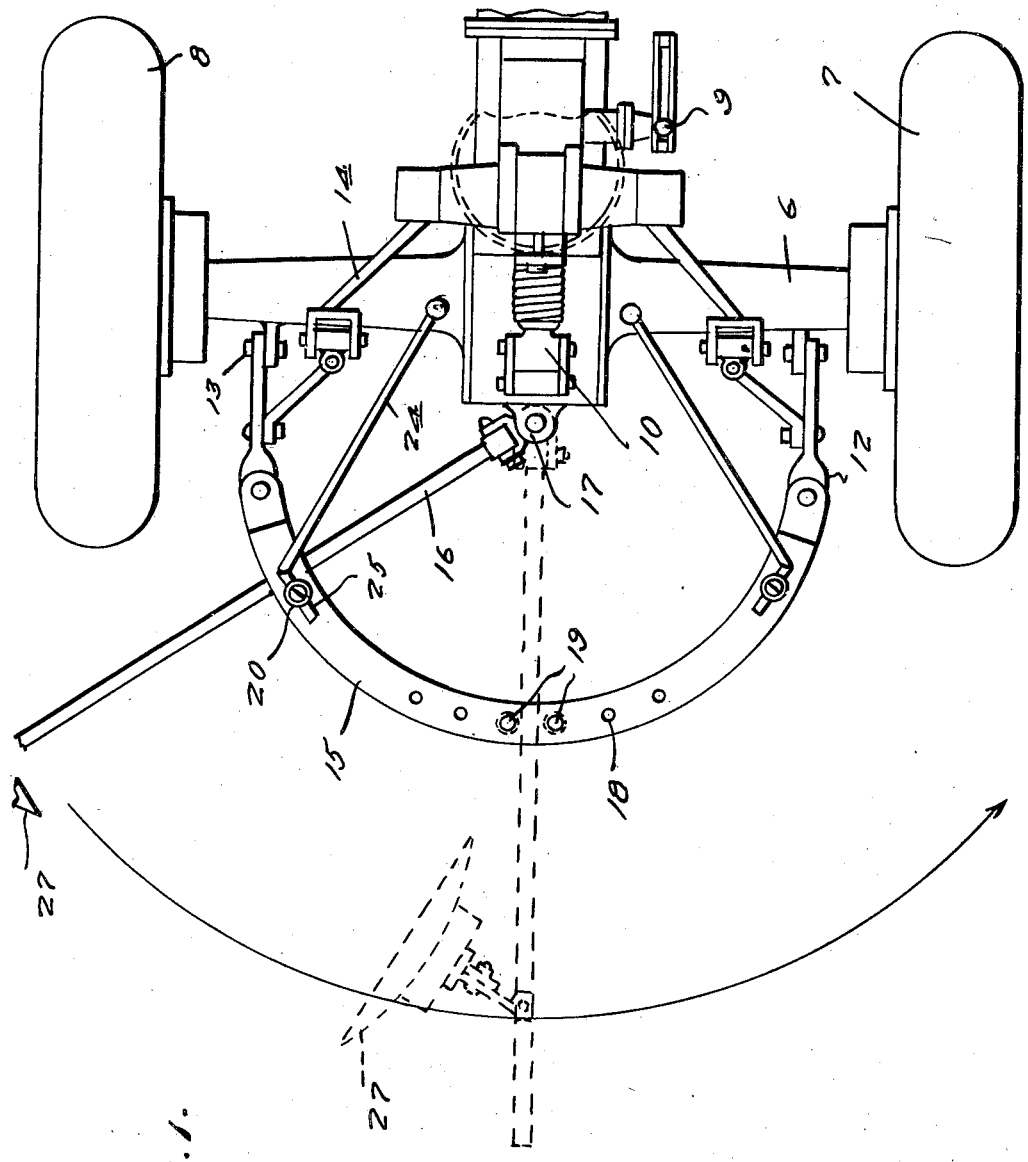
Figure 1 is a top plan view.
Figure 2:
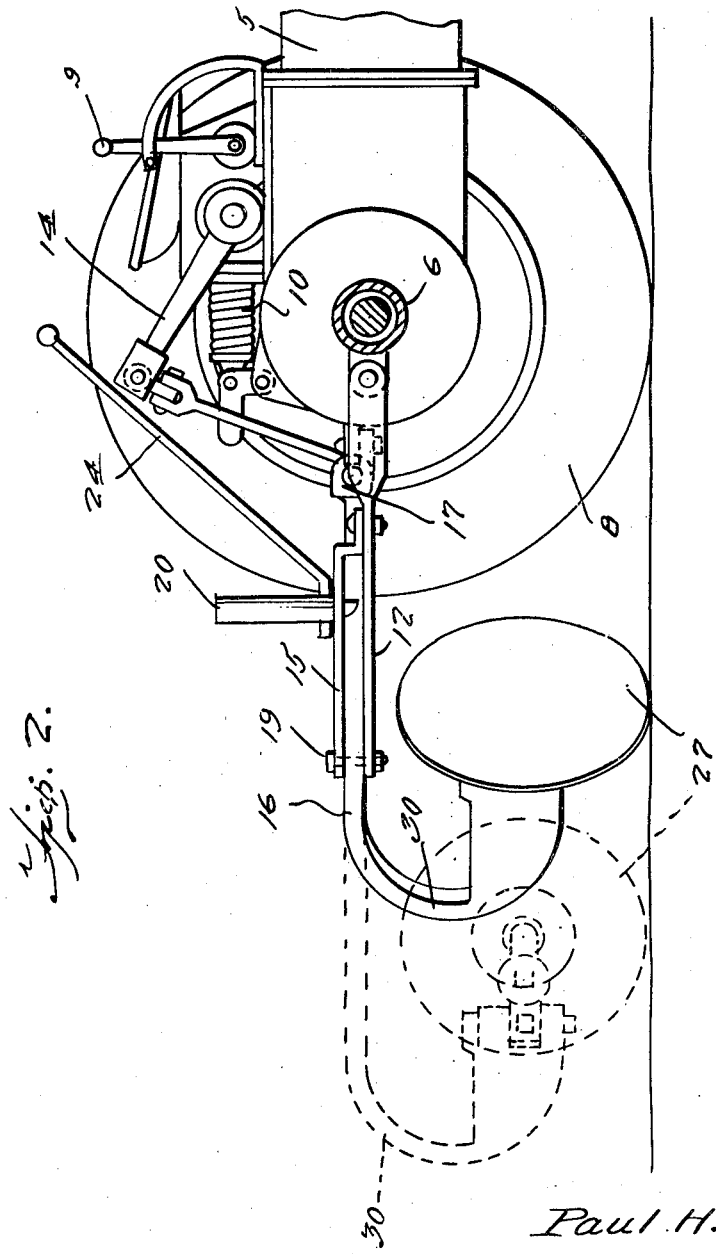
Figure 2 is a side elevational view.
Figure 3:
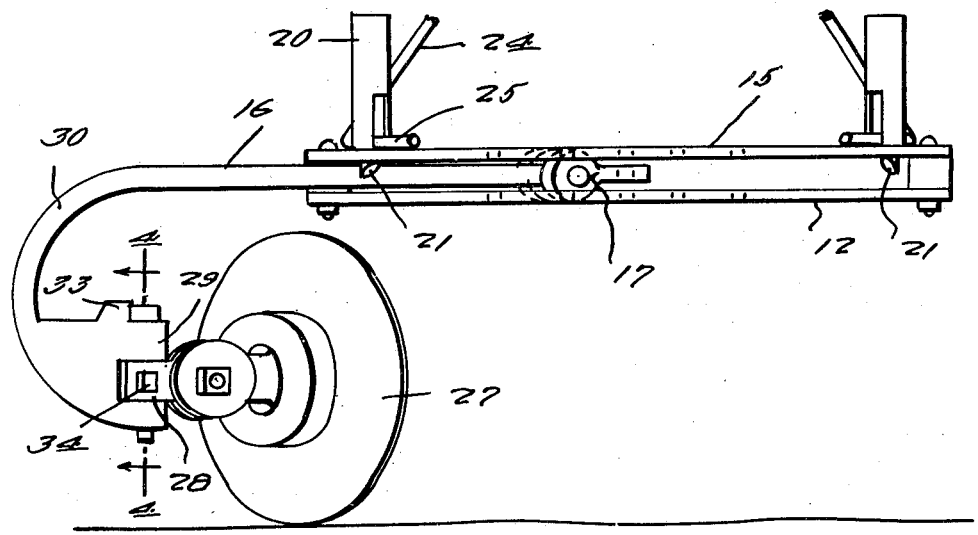
Figure 3 is an enlarged side elevational view showing the adjustable mounting for the plow.

Referring now to the drawings in detail wherein for the purpose of illustration I have disclosed a preferred embodiment of the invention the numeral 5 designates a conventional form of farm tractor which includes the rear axle housing 6 and the right and left rear wheels 7 and 8. In the present form of the invention the tractor is also shown equipped with a hydraulic lift lever 9 and a tractor hitch 10.

A pair of apertured lugs 11 project rearwardly from the axle 6 to which the ends of a semi-circular frame 12 are pivotally attached by means of pins 13 in a manner to provide for the raising and lowering of the frame. The frame is raised and lowered by means of the arms 14 forming part of the hydraulic lift mechanism and which are attached to the frame adjacent the ends thereof.

An arcuate guard plate 15 is secured to the frame 12 in spaced relation above the frame and between the frame 12 and the guide 15 is freely positioned a plow beam 16 which is pivotally attached at its front ends as indicated at 17 to the tractor hitch 10 for lateral swinging movement of the plow beam toward either side of the tractor.

The central portion of the frame 12 and the guide 15 are provided with aligned spaced apart openings 18 adapted for receiving a pair of pins 19 between which the plow beam 16 may be positioned to provide stops for preventing the lateral swinging movement of the plow beam and thus maintain the plow beam in a position adjacent the center of the tractor for level land plowing.

Figure 5:
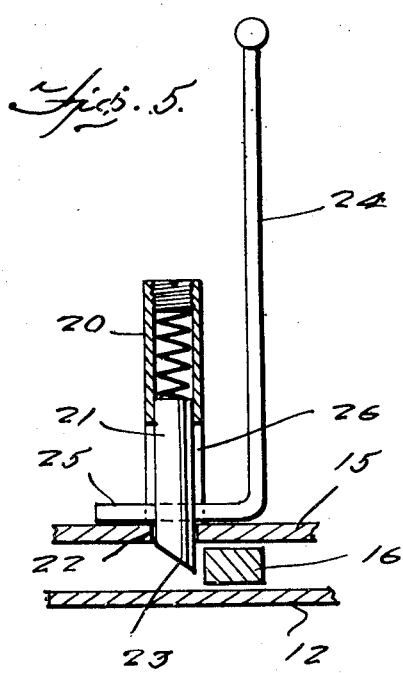
Figure 5 is an enlarged fragmentary sectional view showing one of the catch members for the plow.
Figure 4:
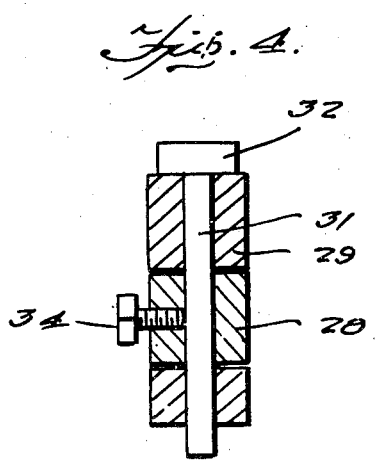
Figure 4 is a sectional view taken substantially on a line 4—4 of Figure 3.

Rising from the guide 15 adjacent each end thereof, is a tubular housing 20 having a spring projected bolt 21 slidably mounted therein and extending downwardly through an opening 22 in the guide into a position to obstruct the path of movement of the plow beam 16, as shown more clearly in Figure 5 of the drawings, to maintain the plow beam in a rearwardly inclined position at either side of the tractor. The lower end of the bolt 21 is formed with a bevelled edge 23 to enable the plow beam 16 to pass freely behind the bolt.

The bolt 21 is retracted by means of a lever 24 having an angular lower end 25 extended transversely through the bolt and adapted to work in slots 26 formed at the lower end of the housing 20, the bolt being retracted by means of a lifting movement of the lever 24 to thus release the plow beam.

A disk plow 27 is mounted at the rear end of the beam 16 by means of a collar 28 positioned between spaced eyes 29 formed on the downwardly curved rear end 30 of the plow beam, the collar 28 being aligned with the eyes 29 for receiving a pin 31 to provide a pivotal mounting for the plow.

The pin 31 is formed with a square head 32 adapted to bear against a lug 33 formed on the uppermost eye 29 to secure the pin against rotation and the collar 28 is secured against pivotal movement on the pin by means of a set screw 34. The plow may thus be secured in an adjusted position on the plow beam as shown by the dotted line position in Figure 1 of the drawings.

In the operation of the device when the plow is used on level land the plow beam 16 is retained in a substantially longitudinally extending position by means of the stop pins 19.

When the plow is used in hillside plowing one of the wheels of the tractor will travel in the previously plowed furrow while the other wheel of the tractor travels on the plowed land, thus permitting the tractor to travel in a substantially level position to maintain an even traction. When the left hand wheel 8 is travelling in the furrow the plow beam 8 will be held in a position extending toward the left by means of the left-hand catch or bolt 21 as shown in Figure 1 of the drawings, the plow 27 occupying a position outwardly beyond the wheel. When the end of the field is reached the frame 12 is raised by means of the hydraulic lift lever 9, thus raising the plow beam 16 and plow 27 out of contact with the ground and before the tractor has been turned in an opposite direction the bolt 21 is retracted, thus permitting the plow beam 16 and plow 27 to gravitate into a position toward the opposite or low side of the tractor behind the bolt at the adjacent side of the frame. The frame and plow is then lowered and the plowing continues.

It is believed that the details of construction and manner of use of the device will be readily understood from the foregoing without further detailed explanation.

Having thus described the invention what I claim is:

The combination with a tractor having a rear axle housing, a power lift mechanism, and a hitch, of a substantially semi-circular frame pivoted at the ends thereof on said housing for vertical swinging movement and connected to said lift mechanism for vertical swinging thereby, an arcuate guard plate fixed on top of said frame and extending along the same in spaced relation therefrom, a plow beam pivoted on said hitch for vertical and lateral swinging movement and extending between the frame and plate to be swung vertically upon vertical swinging of the frame, said beam being freely movable laterally in the space between the frame and plate to be swung laterally under the influence of gravity toward either side of the tractor when said tractor is tilted laterally by inclined ground, and spring-pressed bolts extending downwardly through said guard plate at opposite ends thereof with beveled ends against which said plow beam may move to cam said bolts upwardly, whereby said plow beam may move past the bolts and said bolts snap behind said plow beam to lock the same at either side of the tractor.

PAUL H. CLAY.

REFERENCES CITED

The following references are of record in the file of this patent:

UNITED STATES PATENTS

| Number | Name | Date |
|---|---|---|
| Re. 21,989 | Morkoski | Dec. 30, 1941 |
| 1,997,765 | Brown | Apr. 16, 1935 |
| 2,062,282 | Acton | Dec. 1, 1936 |
| 2,077,942 | Lindgren | Apr. 20, 1937 |
| 2,322,342 | Bunn | June 22, 1943 |

FOREIGN PATENTS

| Number | Country | Date |
|---|---|---|
| 129,544 | Great Britain | July 17, 1919 |
| 708,918 | France | May 5, 1931 |